(12) United States Patent
Roberts et al.

(10) Patent No.: US 8,424,766 B2
(45) Date of Patent: Apr. 23, 2013

(54) SUPPORT ASSEMBLY FOR TERMINAL

(75) Inventors: Clayton Roberts, Tully, NY (US);
Colleen Gannon, Jordan, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 668 days.

(21) Appl. No.: 12/612,446

(22) Filed: Nov. 4, 2009

(65) Prior Publication Data

US 2011/0101100 A1 May 5, 2011

(51) Int. Cl.
*G06K 7/00* (2006.01)
*G06K 7/10* (2006.01)
*G02B 7/02* (2006.01)
*B29D 11/00* (2006.01)

(52) U.S. Cl.
USPC . 235/454; 235/435; 235/462.01; 235/462.43; 359/808; 264/1.1

(58) Field of Classification Search .................. 235/435, 235/454, 462.01; 359/808; 348/294, 340; 264/1.1
See application file for complete search history.

(56) References Cited

U.S. PATENT DOCUMENTS

| | | | |
|---|---|---|---|
| 5,021,651 A | 6/1991 | Ishikawa | |
| 5,822,137 A * | 10/1998 | Abul-Haj et al. | 359/808 |
| 5,838,495 A | 11/1998 | Hennick | |
| 5,846,240 A | 12/1998 | Kortenbach et al. | |
| 5,868,664 A | 2/1999 | Speier et al. | |
| 6,159,200 A | 12/2000 | Verdura et al. | |
| 6,169,628 B1 | 1/2001 | Isbell et al. | |
| 6,361,196 B1 | 3/2002 | Boucheron et al. | |
| 6,390,972 B1 | 5/2002 | Speier et al. | |
| 6,548,895 B1 | 4/2003 | Benavides et al. | |
| 6,629,767 B2 | 10/2003 | Osiecki et al. | |
| 6,719,381 B2 | 4/2004 | Cleereman et al. | |
| 6,821,819 B1 | 11/2004 | Benavides et al. | |
| 7,175,094 B2 | 2/2007 | Bhatia et al. | |
| 7,195,169 B2 | 3/2007 | Bhatia et al. | |
| 7,230,823 B2 | 6/2007 | Richardson et al. | |
| 7,306,156 B2 | 12/2007 | Wulff et al. | |
| 7,312,949 B2 | 12/2007 | Chee et al. | |
| 7,359,144 B2 | 4/2008 | Xu et al. | |
| 7,391,466 B2 | 6/2008 | Machida | |
| 7,402,961 B2 | 7/2008 | Bayat et al. | |
| 7,404,884 B2 | 7/2008 | Montminy et al. | |
| 7,416,129 B2 | 8/2008 | Bhatia et al. | |
| 7,448,412 B2 | 11/2008 | Teach et al. | |
| 7,481,664 B1 | 1/2009 | Knoll et al. | |

(Continued)

OTHER PUBLICATIONS

European Patent Office, European Search Report, European Patent Application Number: 10189688.4, dated Jun. 6, 2011 (9 pages).

(Continued)

*Primary Examiner* — Michael G Lee
*Assistant Examiner* — Laura Gudorf
(74) *Attorney, Agent, or Firm* — Heslin Rothenberg Farley & Mesiti P.C.

(57) ABSTRACT

In one embodiment, there is provided an overmolded support assembly for support of optical elements. In one embodiment the support assembly can be of multi component construction including a base component and a supplementary component, wherein the supplementary component can be overmolded onto the base component. In one embodiment each of the base component and the supplementary component can be of unitary construction. In one embodiment the supplementary component can have a material hardness rating of lower than a material hardness rating of the base component.

27 Claims, 7 Drawing Sheets

U.S. PATENT DOCUMENTS

| | | |
|---|---|---|
| 7,533,821 B2 | 5/2009 | Tsikos et al. |
| 7,534,059 B2 | 5/2009 | Nishizawa |
| 7,559,474 B2 | 7/2009 | Knowles et al. |
| 7,559,475 B2 | 7/2009 | Kotlarsky et al. |
| 2002/0195909 A1 | 12/2002 | Cleereman et al. |
| 2003/0039118 A1 | 2/2003 | Osiecki et al. |
| 2003/0234291 A1 | 12/2003 | Wulff et al. |
| 2004/0195328 A1* | 10/2004 | Barber et al. ............ 235/454 |
| 2004/0211668 A1 | 10/2004 | Montminy et al. |
| 2005/0017077 A1 | 1/2005 | Bhatia et al. |
| 2005/0174468 A1 | 8/2005 | Herranen et al. |
| 2005/0265035 A1 | 12/2005 | Brass et al. |
| 2006/0016486 A1 | 1/2006 | Teach et al. |
| 2006/0061950 A1 | 3/2006 | Richardson et al. |
| 2006/0098307 A1 | 5/2006 | Campean |
| 2006/0193038 A1 | 8/2006 | Regan et al. |
| 2007/0158429 A1 | 7/2007 | Bhatia et al. |
| 2008/0019643 A1 | 1/2008 | Teo et al. |
| 2008/0194960 A1 | 8/2008 | Randall |
| 2008/0220549 A1 | 9/2008 | Nall et al. |
| 2008/0280657 A1 | 11/2008 | Maenpaa et al. |
| 2008/0316121 A1 | 12/2008 | Hobson et al. |
| 2008/0317950 A1 | 12/2008 | Berzon et al. |
| 2009/0009945 A1 | 1/2009 | Johnson et al. |
| 2009/0016074 A1 | 1/2009 | Dolson et al. |
| 2009/0190338 A1 | 7/2009 | Huang |
| 2012/0038821 A1 | 2/2012 | Gannon |

OTHER PUBLICATIONS

Feb. 19, 2013 Amendment After Final filed in U.S. Appl. No. 12/854,319.

* cited by examiner

SUPPORT ASSEMBLY FOR TERMINAL

FIELD OF THE INVENTION

The present invention relates to support assemblies in general and in particular to support assemblies for support of optical elements.

BACKGROUND OF THE PRIOR ART

Optical elements include light emission elements and light receiving elements. Light emission elements can include, e.g., light sources such as light emitting diodes, incandescent light laser diodes. Light emission optical elements can also include light shaping elements, e.g., lens assemblies, prisms, diffusers, mirrors and the like. Light receiving optical elements can include light receiving elements as may be provided by lens assemblies, prisms, and mirrors as well as light sensing elements such as photodiodes and image sensors including a plurality of photodiodes.

Support assemblies are known for support of optical elements. For example, it is known to provide a support assembly in association with an image sensor integrated circuit of an imaging terminal. Such support assemblies are known to provide support to an imaging lens as well as to provide containment for the image sensor integrated circuit, restricting particulate, e.g., dust and debris from entering the area of an image sensor integrated circuit.

SUMMARY OF THE INVENTION

In one embodiment there is provided an overmolded support assembly for support of optical elements. In one embodiment the support assembly can be of multi component construction including a base component and a supplementary component, wherein the supplementary component can be overmolded onto the base component. In one embodiment each of the base component and the supplementary component can be of unitary construction. In one embodiment the supplementary component can have a material hardness rating of lower than a material hardness rating of the base component.

DETAILED DESCRIPTION OF THE INVENTION

Referring to the figures, there is provided in one embodiment an overmolded support assembly 10 for support of optical elements. In one embodiment the support assembly 10 can be of multi component construction including a base component 12 and a supplementary component 14, wherein the supplementary component 14 is overmolded onto the base component. In one embodiment each of the base component 12 and the supplementary component 14 can be of unitary construction. In one embodiment, the supplementary component 14 can have a lower material hardness rating than a material harness rating of the base component 12 and base component 12 can correspondingly have a greater material hardness rating than supplementary component 14. In one embodiment, more than one supplementary component 14 can be provided. In one embodiment, the supplementary component 14 can be formed by overmolding of the supplementary component 14 onto the base component 12 by way of a process of injection molding. Each of base component 12 and supplementary component 14 can be of unitary construction.

Figure 1:
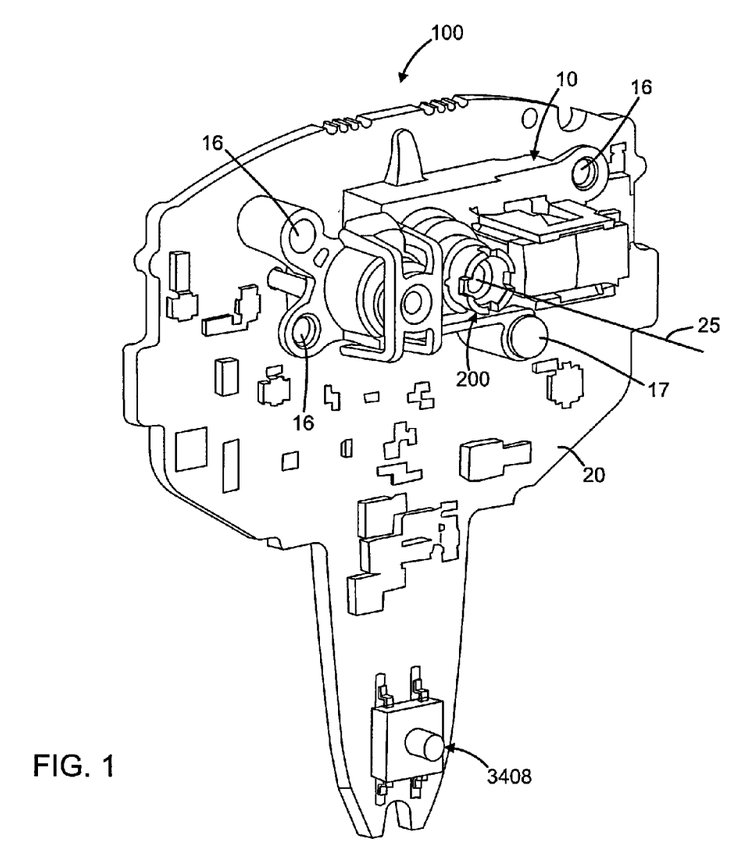
FIG. 1 is a perspective view of an apparatus having a support assembly supporting optical elements for use in a terminal.

Referring to FIG. 1, there is shown an apparatus 100 for use in a terminal having optical elements. Apparatus 100 can include a printed circuit board 20 and a support assembly 10 for support of optical elements. As will be described herein, such optical elements can include light emission optical elements and/or light receiving optical elements. Such optical elements can comprise, e.g., optical assemblies, e.g., lens assemblies, light pattern generating assemblies, parts of optical assemblies, or discrete parts.

Figure 2:
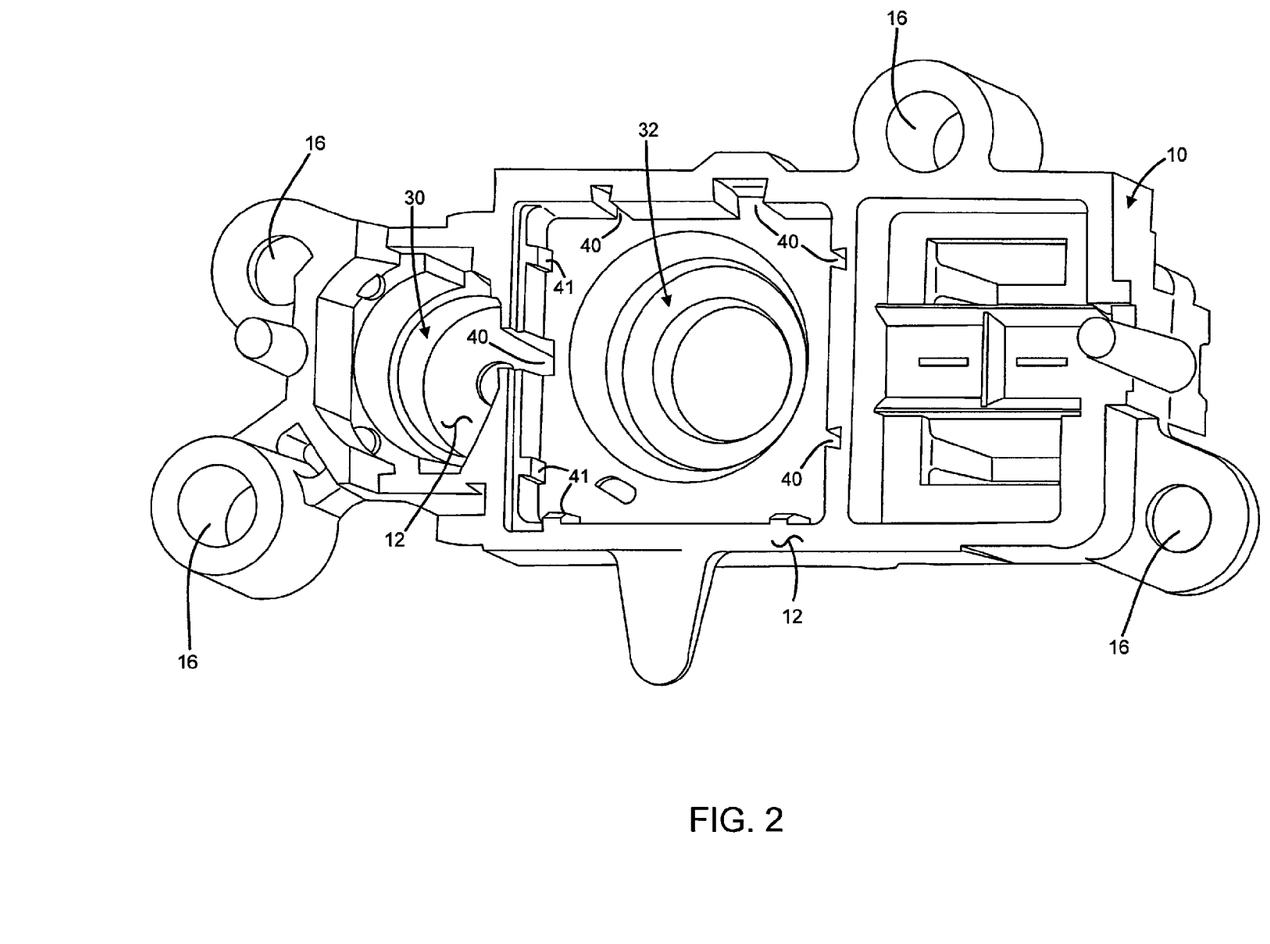
FIG. 2 is rear view of a partially manufactured support assembly as shown in front perspective view in FIG. 1.
Figure 3:
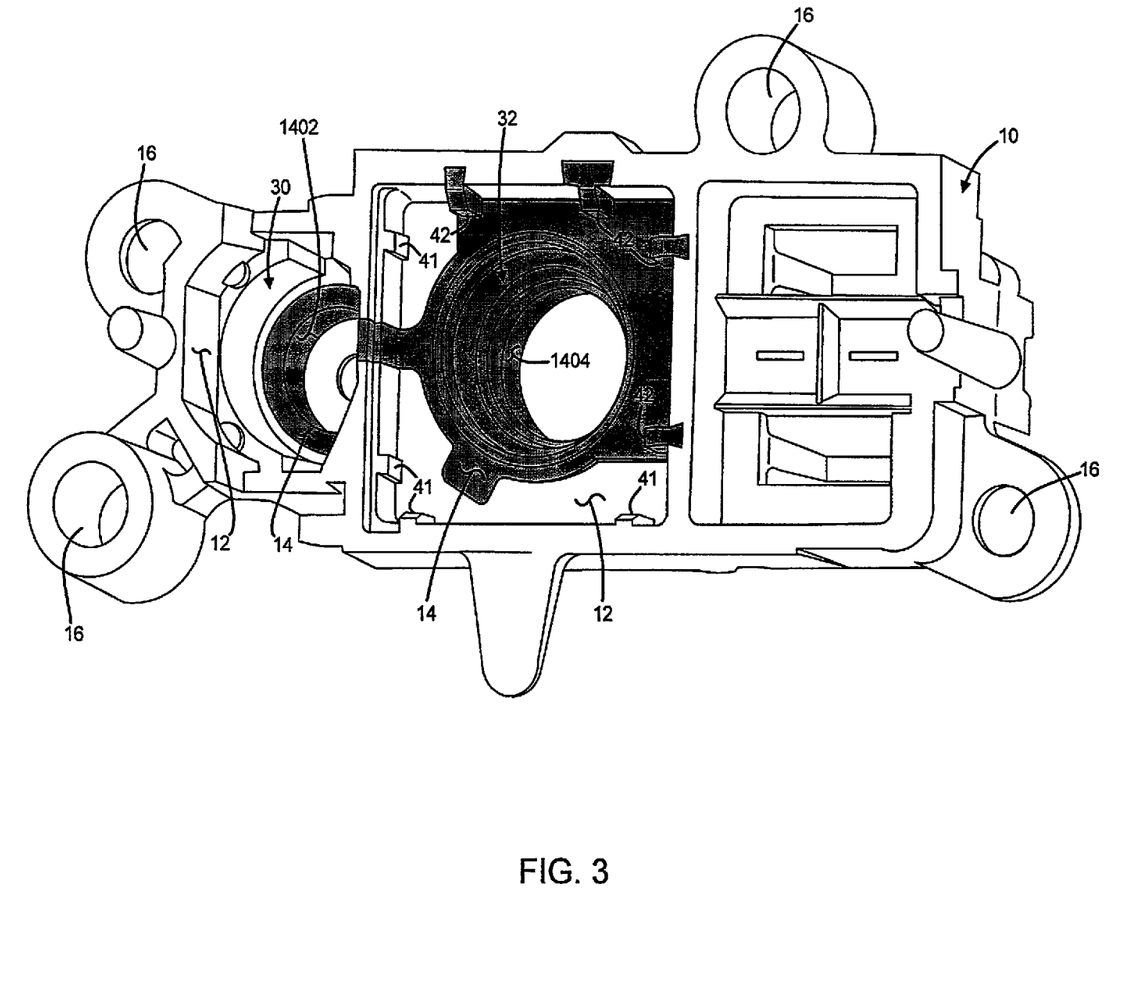
FIG. 3 is a rear view of manufactured support assembly as shown in first perspective view in FIG. 1.

Perspective assembly views of the support assembly 10 in one embodiment are shown in FIG. 2 and FIG. 3. Support assembly 10 can be adapted for securing in a certain position in relation to printed circuit board 20 or other member external to support assembly 10. Support assembly 10 can include a base component 12 (first component) comprising a first material and a supplementary component 14 comprising a second material. Referring to a method for manufacture, the supplementary component 14 (second component) can be formed by overmolding material forming the supplementary component onto the base component by way of an overmolding manufacture process. In one embodiment, the supplementary component 14 can have a lower material hardness rating than a material hardness rating of the base component 12 and base component 12 can have a corresponding greater material hardness rating than supplementary component 14. In one embodiment, base component 12 can comprise rigid material, and supplementary component 14 can comprise deformable material. Base component 12 can be provided by e.g., polycarbonate, or metal, e.g., steel, aluminum. Supplementary component 14 can be provided by e.g., thermoplastic elastomer (TPE). Some examples of TPE are VERSAFLEX alloys and VERSOLLAN elastomer alloys from GLS THERMOPLASTIC ELASTOMERS. The providing of supplementary component 14, where comprised of deformable material, allows for interference fitting with components being supported. The providing of base component 12, where comprised of rigid material provides for consistent support of various components over time and protection of components from damage by outside forces (e.g., as might be experienced by a drop).

Referring to FIG. 2, FIG. 2 shows support assembly 10 in an intermediate state of manufacture prior to the overmolding of supplementary component 14. In the pre-overmolded state as shown in FIG. 2, support assembly 10 can comprise the base component only, and can be of unitary construction. As shown in FIGS. 2 and 3, support assembly 10 can define a plurality of regions. In the embodiment as set forth in FIGS. 2 and 3, support assembly 10 can comprise a first region 30 for support of a light emission optical element and a second region 32 for support of a light receiving optical element. In the embodiment of FIGS. 2 and 3, base component 12 can have a plurality of formations 40 for increasing a securing force with which supplementary component 14 is secured with respect to base component 12 when the supplementary component 14 is overmolded into the base component 12. While outside securing agents, e.g., adhesives, can be used to secure supplementary component 14 to base component 12, an overmolding injection molding manufacturing process generally allows supplementary component 14 to be secured relative to base component 12 without use of adhesives or other outside securing agents.

Figure 4:
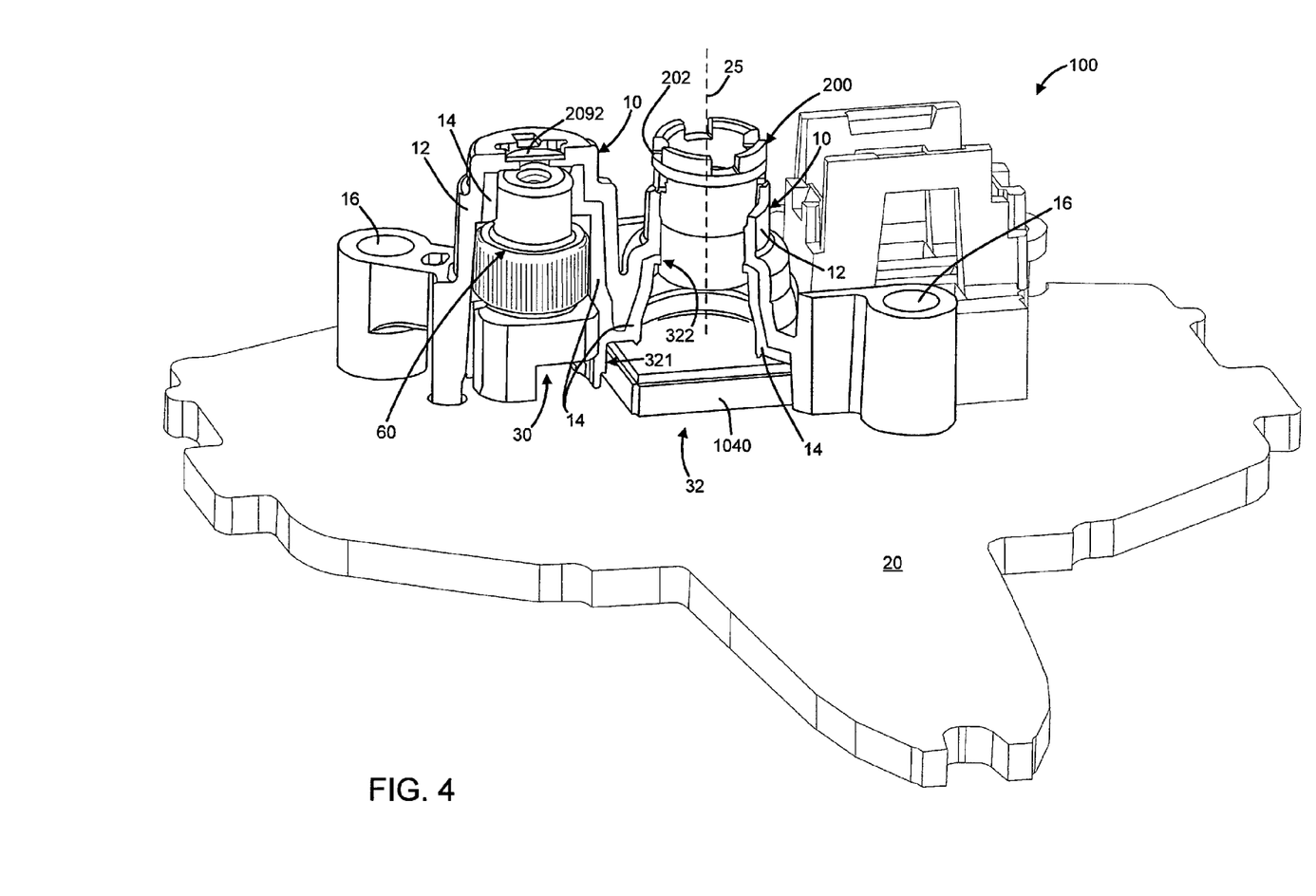
FIG. 4 is a perspective cross-sectional view of the apparatus as shown in FIG. 1.
Figure 5:
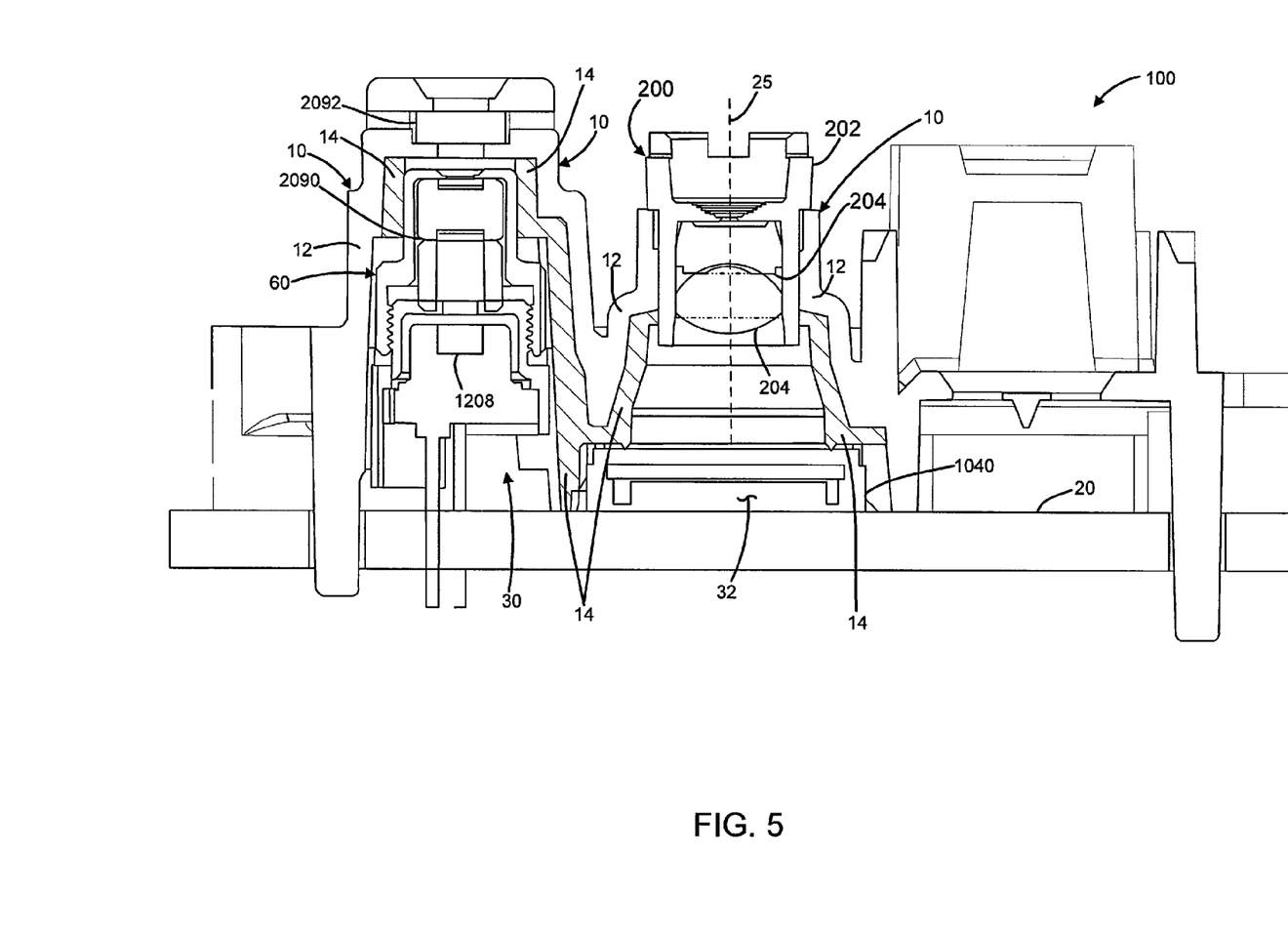
FIG. 5 is side cross-sectional view of the apparatus shown in FIG. 1.

Further aspects of support assembly 10 and apparatus 100 are described with reference to FIGS. 4 and 5, showing, respectively, perspective and side cross-sectional views of apparatus 100. Supplementary component 14 can function as a seal to restrict the entry of particulate, e.g., dust and debris into the interior of the support assembly 10.

Referring to first region 30 of support assembly 10, surfaces of support assembly 10 defining first region 30 can support laser diode assembly 60 and surfaces of support assembly 10 defining second region 32 can have a first section 321 for support of image sensor integrated circuit 1040 and a second section 322 for support of imaging lens assembly 200. Imaging lens assembly 200 can comprise one or more lens elements 204 (see FIG. 5) which can be housed in a lens barrel 202. Support assembly 10 can be provided so that supplementary component 14 contacts image sensor integrated circuit 1040 when apparatus 100 is assembled. Supplementary component 14 can function as a seal to restrict the entry of particulate including dust into the interior of support assembly 10. In the exemplary embodiment, laser diode assembly 60 and image sensor integrated circuit 1040 can be mounted to printed circuit board 20. Surfaces defining first region 30 can support laser diode assembly 60 in a certain position in relation to diffractive element 2092. Surfaces defining second region 32 (namely, in the specific example, those surfaces defining first section 321 can support the optical element provided by image sensor integrated circuit 1040). Surfaces defining second region 32 (namely, in the specific example those surfaces defining second section 322) can support optical elements making up imaging lens assembly 200 in relation to image sensor integrated circuit 1040.

In the development of support assembly 10, the inventors determined that a problem of a typical prior art support assembly including a separately formed gasket for sealing image sensor integrated circuit 1040 is that the separate manufacture of the support assembly major body and the gasket creates a risk of contamination of the interior of the support assembly 10. That is, when the gasket is associated to the support assembly major body, particulate is often introduced in the process of association. Further, adhesives are customarily used for attachment of a gasket to a support assembly major body. Adhesives tend to flake off to create particulate contaminating a support assembly interior, to possibly interfere with operation of a sensor component.

The providing of supplementary component 14 of support assembly 10 by way of overmolding the supplementary component 14 onto base component 12 reduces the risk of contamination of a support assembly interior by way of association of a separately manufactured support assembly major body and gasket.

In addition to providing advantages of maintaining the support assembly 10 substantively free of particulate, support assembly 10 comprising supplementary component 14 can be adapted to provide a range of additional advantages. For example, one or more surfaces defining first region 30 and second region 32 where supplementary component 14 comprises deformable material can be provided to be in interference fitting relation with optical elements being supported by support assembly 10. For providing interference fitting between support assembly 10 and a supported optical element a set of surfaces of support assembly 10 for support of an optical element can be sized to a dimension relatively smaller than a dimension of a corresponding optical element at the area being supported but nevertheless can be fit over the relatively larger dimensioned optical element virtue of at least one surface of the support assembly being capable of deforming during the fitting process.

In one embodiment, base component 12 can be formed of rigid material and supplementary component 14 can be formed of deformable material to provide interference fitting. One or more surfaces of support assembly 10 that are adapted to be interference fit with optical elements of apparatus 100 can comprise one or more surfaces of supplementary component 14. For example, interior surface 1402 of supplementary component 14, in one example as best seen in FIG. 3 can define interference fitting surfaces of support assembly 10. With first region and second region 30 and 32 (including section 321 and section 322) providing interference fitting with certain optical elements, a number of manufacturing and performance benefits can be realized. For a better understanding of advantages that can be yielded by providing of an interference fitting, it can be observed that interior surface 1402 can be adapted to encircle, hold and support laser diode assembly 60 to define interference fitting surfaces of support assembly 10 and can be in interference fitting in relation with laser diode assembly 60 of aiming pattern generating assembly 1210 (depicted in FIG. 6). Similarly, surface 1404 of supplementary component 14 as best seen in FIG. 3 can be adapted to encircle, hold and support and be in interference fitting in relation with lens barrel 202 of imaging lens assembly 200.

Support assembly 10 can also be adapted so that interference fitting surfaces of support assembly 10 are provided by a combination of one or more surfaces of base component 12 and supplementary component 14. For example, in the specific embodiment of FIGS. 1-5 a combination of at least one surface of base component 12 and supplementary component 14 can define an interference fit with respect to image sensor integrated circuit 1040. Referring to details of the described image sensor integrated circuit supporting section 321 of second region 32, base component 12 can include ribs 41 and supplementary component 14 can also include ribs 42. An image sensor integrated circuit 1040 can be interference fit onto ribs 41 and 42 so that integrated circuit 1040 is in interference fitting relation with a combination of surfaces of support assembly 10 including surfaces of base component 12 and supplementary component 14. In the specific example of FIGS. 1-5, each of one or more surfaces of base component 12 and one or more surfaces of supplementary component 14 impart forces to image sensor integrated circuit 1040. Further, in the specific embodiment of FIGS. 1-5 each of one or more surfaces of base component 12 and one or more surfaces of supplementary component 1040 can contact image sensor integrated circuit 1040.

Without interference fitting being provided, i.e., where support assembly 10 comprises uniform rigid material, support assembly 10 must be sized larger than optical elements supported thereby, thereby defining gaps between support assembly 10 and a supported optical element. A presence of such gaps can negatively affect performance of a terminal that incorporates apparatus 100. For example, a presence of such gaps can allow for supported optical elements to become misaligned over time, e.g., by the impartation of a force, e.g., as may be encountered by a drop. A presence of such gaps can also allow unwanted emission of light rays from an apparatus 100. For example, if apparatus 100 incorporates a light emission optical element, a presence of a gap can cause light to be projected to a position other than its desired position. A presence of such gaps can allow unwanted light rays to enter on interiors of support assembly 10. For example, in the case that support assembly 10 supports an image sensor integrated circuit 1040, gaps between assembly 10 and a supported optical element can result in light entering an interior of assembly 10 undesirably affecting an output signal output by the image sensor integrated circuit 1040. Also, particulate can enter an interior of support assembly 10 through a defined gap to block, refract, or redirect emitted or received light to negatively impact functioning of a terminal incorporating apparatus 100.

Such sizing, i.e., with support assembly 10 being larger than a supported optical element to define a gap (a clearance) between a support assembly and a supported optical element also adds to the manufacturing complexity. With loose fitting between a support assembly and a supported optical element, a plurality of manufacturing steps are often required to position a supported optical element at one of a variable number of possible positions within a loose fitting.

Using overmolding injection molding processes, sizing tolerances of formed parts can be tightly controlled. Accordingly, dimension of surfaces of support assembly 10 including supplementary component 14 overmolded onto base component 12 can be tightly controlled within a tight tolerance range. Tight control over the dimensions of surfaces of support assembly 10 provides significant advantages. For example, in the manufacture of apparatus 100 including optical elements (whether light emission optical elements or light receiving elements) significant manufacturing process steps are often undertaken to assure proper alignment of optical elements. For example, if a combination of optical elements are to project a light pattern, manufacturing steps are often undertaken to assure a pattern is projected at a certain position. If a light receive system requires a certain focus position, alignment steps are often carried out to assure certain spacing between, e.g., a plurality of lenses of a lens assembly, or between a lens and a light sensor.

Performance of currently available optical element support assemblies is commonly encumbered by stack-up error. Multiple sources of stack-up error are present with support assemblies of currently available terminals. For example, a function of a currently available support assembly can be to align a first optical element in the form of a lens assembly with a second optical element in the form of an image sensor integrated circuit. Such alignment on one type of currently available terminal can be dependant on (a) variations in positions at which a support assembly can be positioned with respect to a circuit board (it might have pins which "float" within pin holes while securing), or (b) variations of positions at which an image sensor integrated circuit can be secured to a printed circuit board. Special and complex manufacturing steps are often carried out to account for stack-up error, and such special steps often involve introduction of extraneous members, e.g., gaskets, spacers, adhesives into an apparatus in which optical elements are supported. Such additional steps and members often lead to misalignment in a system and inconsistencies between manufactured apparatus in which optical elements are supported, e.g., a first apparatus can be structured differently and therefore operate differently from a second similarly designed apparatus in which optical elements are supported.

Support assembly 10 comprising supplementary component 14 substantially avoids stack-up error. Support assembly 10 can be provisioned to provide interference fitting so that in some embodiments application of extraneous members (commonly introduced for addressing of stack-up error) is not required. For securing a position between a supported optical element and support assembly 10, apparatus 100 can be devoid of adhesives or a relatively reduced amount of adhesive can be used which merely augments a securing force provided by an interference fit, but which does not alone provide the securing force. Further, stack-up error is reduced with support assembly 10 since, using overmolding injection molding processes, support assembly 10 including base component 12 and supplementary component 14 can be manufactured to tight tolerances, support assembly 10 can include both deformable and rigid surfaces such that gaps between a support assembly and supported optical elements can be reduced or avoided without compromising the structural and containment advantage of a support assembly. Referring to specific examples, image sensor integrated circuit 1040 can be held in proper alignment to lens assembly 200 more accurately because supplementary component 14 is deformable and image sensor integrated circuit 1040 is benched against ribs 41 by interference with ribs 42. Dimensions and their tolerances are taken from ribs 41 of support assembly 10 in establishing the relationship (fit) of 1040 and 200 rather than through multiple parts, thereby reducing stack-up error.

Now referring to certain particular features of the specific embodiment of FIGS. 1-5, second region 32 of support assembly 10 can be adapted for support of image sensor integrated circuit 1040. As best seen in FIG. 3, surfaces of support assembly 10 for support of image sensor integrated circuit 1040 can be partially defined by surfaces of base component 12 and partially defined by surfaces of supplementary component 14. Support assembly 10 can be adapted so that surfaces of both base component 12 and supplementary component 14 can contact image sensor integrated circuit 1040. In one embodiment, base component 12 can comprise rigid material and supplementary component 14 can comprise deformable material. Configured as described, image sensor integrated circuit 1040 can be interference fit into support assembly 10 where it can be partially secured by base component 12 and partially secured by supplementary component 14. The described image sensor integrated circuit optical element supporting arrangement provides significant advantages. In currently available support assemblies, where there is clearance between a support assembly and an image sensor integrated circuit, a number of assembly steps are undertaken to align the support assembly (which can be supporting one or more additional optical elements such as an imaging lens assembly or a part thereof) with the image sensor integrated circuit. Because of the tight manufacturing tolerances to which support assemblies 10 as set forth herein can be manufactured, apparatus 100 can be adapted to that support assembly 10 and lens assembly 200 held therein are in proper alignment with image sensor integrated circuit 1040 when image sensor integrated circuit 1040 is interference fit with support assembly 10.

It will be understood that many variations of support assembly 10 are possible. For example, support assembly 10 need not have the number of regions but may have a greater number or a lesser number of regions. For example, in one embodiment support assembly need only include one region, e.g., in one embodiment single region constructed in accordance with first region 30, in another embodiment, a single region constructed in accordance with second region 32. Further, each region 30, 32 can have more than or less than the number of sections than the number shown. In one example, section 321 can be deleted. In another example, section 322 can be deleted. Also, for example, the function of the single supplementary component 14 of unitary construction which in the embodiment highlighted extends into the first and second region can be provided by a plurality of separate supplementary components 14. Support assembly 10 can be adapted for securing of support assembly 10 in a certain position with respect to printed circuit board 20. For example, support assembly 10 can have a plurality of screw holes 16 and can be screwed into printed circuit board 20 with one of screws 17. While support assembly 10 in the described embodiment supports elements relative to a member in the form of a printed circuit board, support assembly 10 could also be adapted to support optical elements relative to another type of member.

Figure 6:
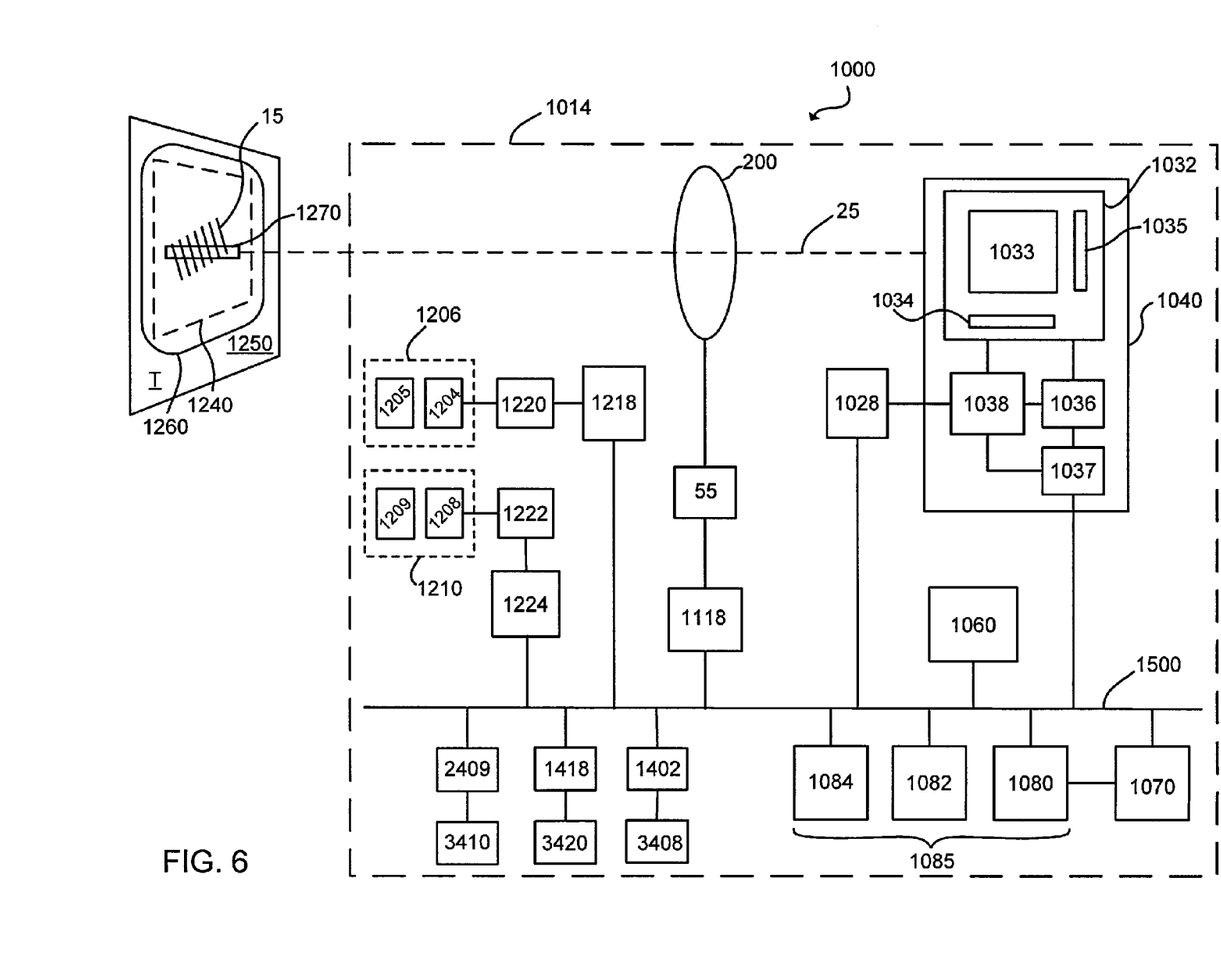
FIG. 6 is a block diagram of a terminal incorporating a support assembly.

Referring now to aspects of an exemplary terminal incorporating apparatus 100, terminal 1000 as described in connection with the block diagram of FIG. 6 in one embodiment can be an indicia reading terminal and can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036, and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. In one embodiment, image sensor integrated circuit 1040 can include less than the highlighted components, e.g., can be devoid of components 1036 to 1037, which can be provided apart from an image sensor integrated circuit 1040. In one example, image sensor integrated circuit 1040 can be provided by an MT9V022 image sensor integrated circuit available from Micron Technology, Inc. In another example, image sensor integrated circuit 1040 can incorporate a Bayer pattern filter. In such an embodiment, CPU 1060 prior to subjecting a frame to further processing can interpolate pixel values for pixel positions intermediate of green pixel position for development of a monochrome frame of image data. Alternatively, CPU 1060 prior to subjecting a frame to further processing can interpolate pixel values at pixel positions intermediate of red pixel positions or blue pixel positions.

In the course of operation of terminal 1000, image signals can be read out of image sensor 1032 and converted and stored into a system memory such as RAM 1080. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include CPU 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of terminal 1000, imaging lens assembly 200 can be adapted for focusing an image of a decodable indicia 15 located within a field of view 1240 on a substrate 1250 onto image sensor array 1033. Imaging light rays can be transmitted about imaging axis 25. Imaging lens assembly 200 in one embodiment can be adapted to be capable of multiple focal lengths and multiple best focus distances. In one embodiment, imaging lens assembly 200 can be a fixed optical assembly having a fixed focal length and best focus distance.

Terminal 1000 can also include an illumination pattern light source bank 1204 and associated light shaping optics 1205 for generating an illumination pattern 1260 substantially corresponding to a field of view 1240 of terminal 1000. The combination of bank 1204 and optics 1205 can be regarded as an illumination pattern generating assembly 1206. Terminal 1000 can also include an aiming pattern light source bank 1208 and associated light shaping optics 1209 for generating an aiming pattern 1270 on substrate 1250. The combination of bank 1208 and optics 1209 can be regarded as an aiming pattern generating assembly 1210. In the embodiment described in FIGS. 1-5, aiming pattern generating assembly 1210 can be provided by the combination of light source bank 1208 (provided in the specific embodiment with laser diode assembly 60) and optics 1209 can be can be provided in part by lens 2090 within laser diode assembly 60 and diffractive element 2092 disposed optically forwardly of laser diode assembly 60. In the specific embodiment of FIGS. 1-5, support assembly 10 can be adapted for interference fitting of light emission optical elements for generation of an assembly pattern. Support assembly 10 can also be adapted for providing of interference fitting for light emission optical elements of illumination pattern generating assembly 1206 for generation of an illumination pattern 1260. Each bank 1204 and bank 1208 can have one or more light sources.

In use, terminal 1000 can be oriented by an operator with respect to a substrate 1250 bearing decodable indicia 15 in such manner that aiming pattern 1270 is projected on a decodable indicia 15. In the example of FIG. 2, decodable indicia 15 is provided by a 1D bar code symbol. Decodable indicia 15 could also be provided by a 2D bar code symbol or optical character recognition (OCR) characters. Each of illumination pattern light source bank 1204 and aiming pattern light source bank 1208 can include one or more light sources. Optical assembly 200 can be controlled with use of electrical power input unit 55 which provides energy for changing a plane of optimal focus of optical assembly 200. In one embodiment, an electrical power input unit 55 can operate as a controlled voltage source, and in another embodiment, as a controlled current source. Illumination pattern light source bank 1204 can be controlled with use of illumination pattern light source bank control circuit 1220. Aiming pattern light source bank 1208 can be controlled with use of aiming pattern light source bank control circuit 1222. Electrical power input unit 55 can apply signals for changing optical characteristics of optical assembly 200, e.g., for changing a focal length and/or a best focus distance of (a plane of optimum focus of) imaging lens assembly 200. Where optical assembly 200 is a fixed optical assembly, power input unit 55 and its associated interface 1118 can be deleted. Illumination pattern light source bank control circuit 1220 can send signals to illumination pattern light source bank 1204, e.g., for changing a level of illumination output by illumination pattern light source bank 1204. Aiming pattern light source bank control circuit 1222 can send signals to aiming pattern light source bank 1208, e.g., for changing a level of illumination output by aiming pattern light source bank 1208.

Terminal 1000 can also include a number of peripheral devices including trigger 3408 which may be used to make active a trigger signal for activating frame readout and/or certain decoding processes. Terminal 1000 can be adapted so that activation of trigger 3408 activates a trigger signal and initiates a decode attempt. Specifically, terminal 1000 can be operative so that during an operator activated read attempt activated in response to activation of a trigger signal, a succession of frames can be read out and captured by way of read out of image information from image sensor array 1033 (typically in the form of analog signals) and then storage of the image information after conversion into memory 1080 (which can buffer one or more of the succession of frames at a given time). CPU 1060 can be operative to subject one or more of the succession of frames to a decode attempt. For attempting to decode a bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup.

CPU 1060, appropriately programmed can carry out a decoding process for attempting to decode a frame of image data. Terminal 1000 can be operative so that CPU 1060 for attempting to decode a frame of image data can address image data of a frame stored in RAM 1080 and can process such image data. For attempting to decode, CPU 1060 can sample image data of a captured frame of image data along a sampling path, e.g., along a first sampling path through a first set of pixel positions. Next, CPU 1060 can perform a second derivative edge detection to detect edges. After completing edge detection, CPU 1060 can determine data indicating widths between edges. CPU 1060 can then search for start/stop character element sequences and if found, derive element sequence characters, character by character by comparing with a character set table. For certain symbologies, CPU 1060 can also perform a checksum computation. If CPU 1060 successfully determines all characters between a start/stop character sequence and successfully calculates a checksum (if applicable), CPU 1060 can output a decoded message. Where a decodable indicia representation is a 2D bar code symbology, a decode attempt executed by CPU 1060 can comprise the steps of locating a finder pattern using a feature detection algorithm, locating scan lines intersecting the finder pattern according to a predetermined relationship with the finder pattern, determining a pattern of dark and light cells along the scan lines, and converting each light pattern into a character or character string via table lookup.

Terminal 1000 can include various interface circuits for coupling various of the peripheral devices to system address/data bus (system bus) 1500, for communication with CPU 1060 also coupled to system bus 1500. Terminal 1000 can include interface circuit 1028 for coupling image sensor timing and control circuit 1038 to system bus 1500, interface circuit 1118 for coupling electrical power input unit 55 to system bus 1500, interface circuit 1218 for coupling illumination pattern light source bank control circuit 1220 to system bus 1500, interface circuit 1224 for coupling aiming pattern light source bank control circuit 1222 to system bus 1500, and interface circuit 1402 for coupling trigger 3408 to system bus 1500. Terminal 1000 can also include a display 3420 coupled to system bus 1500 and in communication with CPU 1060, via interface 1418, as well as pointer mechanism 3410 in communication with CPU 1060 via interface 2409 connected to system bus 1500.

A small sample of system methods and apparatus are described herein as follows:

A1. An indicia reading terminal for use in reading indicia, said indicia reading terminal comprising:
 a member;
 an optical element, the optical element being selected from the group consisting of a light emission optical element and a light receive optical element;
 a support assembly for support of the optical element in a certain position relative to the member, the support assembly having a base component and a supplementary component, wherein the support assembly is formed by overmolding the supplementary component onto the base component, the supplementary component having a material hardness rating of less than a material hardness rating of the base component, wherein the support assembly is adapted for interference fitting with the optical element.

A2. The indicia reading terminal of A1, wherein the optical element is a light emission optical element.

A3. The indicia reading terminal A2, wherein the light emission optical element is a laser diode assembly.

A4. The indicia reading terminal of A1, wherein the optical element is an image sensor integrated circuit.

A5. The indicia reading terminal of A1, wherein the optical element is an imaging lens assembly.

A6. The indicia reading terminal of A1, wherein the support assembly includes a first region for support of a light emission optical element and a second region for support of a light receiving optical element.

A7. The indicia reading terminal of A6, wherein the second region for support of a light receive optical element supports a plurality of light receive optical elements, the plurality of light receive optical elements including an image sensor integrated circuit and an imaging lens assembly.

A8. The indicia reading terminal of A6, wherein the support assembly includes a first region in interference fitting relation with a first optical element provided by image sensor integrated circuit, and a second region in interference fitting relation with a second optical element provided by an imaging lens assembly supported in an aligned position relative to the image sensor integrated circuit.

A9. The indicia reading terminal of A1, wherein the base component is of unitary construction.

A10. The indicia reading terminal of A1, wherein the supplementary component is of unitary construction.

A11. The indicia reading terminal of A1, wherein one or more surfaces of the supplementary component adapt the support assembly for interference fitting with the optical element.

A12. The indicia reading terminal of A1, wherein one or more surfaces of the base component in combination with one or more surfaces of the supplementary component adapt the support assembly for interference fitting with the optical element.

A13. The indicia reading terminal of A1, wherein the member is a printed circuit board.

B1. A support assembly for support of a plurality of optical elements, the support assembly comprising:
 a first region for support of a light emission optical element;
 a second region for support of light receive optical element;
 wherein each of the first region and the second region are adapted to provide interference fitting with a supported optical element.

B2. The support assembly of B1, wherein the support assembly comprises a base component comprising rigid material, and a supplementary component comprising deformable material.

B3. The support assembly of B2, wherein the supplementary component is overmolded onto the base component.

C1. A support assembly comprising:
a region for support of an image sensor integrated circuit, the region being partially defined by a base component and a supplementary component, the base component having a greater material hardness rating than the supplementary component, the region being adapted for interference fitting with the image sensor integrated circuit.

C2. The support assembly of C1, wherein the supplementary component is overmolded onto the base component.

C3. The support assembly of C1, wherein the region is further adapted for support of an imaging lens assembly at a certain position relative to the image sensor integrated circuit.

C4. A support assembly of C1, wherein the support assembly is adapted so that each of a surface of the base component and the supplementary component imparts forces to the image sensor integrated circuit chip.

D1. A support assembly for support of an optical element, the support assembly comprising:
a base component;
a supplementary component overmolded onto the base component;
wherein the support assembly is adapted for securing in a certain position relative to a member external to the support assembly; and
wherein the support assembly is adapted for interference with an optical element selected from the group consisting of a light emission optical element and a light receiving optical element;
wherein the base component has a material hardness rating of greater than that of the supplementary component;
wherein the interference fit is at least partially defined by the supplementary component.

D2. The support assembly of D1, wherein the support assembly is adapted for securing in a certain position relative a printed circuit board.

Figure 7:
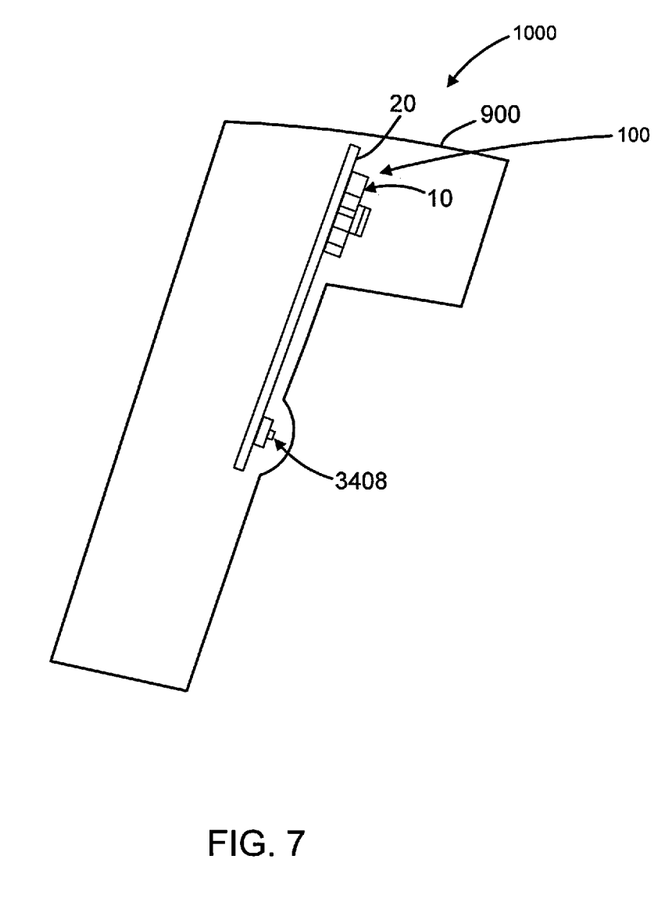
FIG. 7 is a schematic diagram illustrating a hand held housing incorporating a support assembly.

Referring to FIG. 7, there is shown an embodiment of a terminal incorporating apparatus 100. As shown in FIG. 7, terminal 1000 can include a hand held housing 900 which supports, incorporates, and encapsulates apparatus 100 including support assembly 10. In one example, hand held housing 900 can incorporate the elements within dashed-in border 1014 as shown in FIG. 6, many of which elements, e.g., lens assembly 200, image sensor integrated circuit 1040, illumination pattern generating assembly 1206, aiming pattern generating assembly 1210, can be incorporated as part of apparatus 100.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or more than the mentioned certain number of elements. Also, while a number of particular embodiments have been described, it will be understood that features and aspects that have been described with reference to each particular embodiment can be used with each remaining particularly described embodiment.

We claim:

1. An indicia reading terminal for use in reading indicia, said indicia reading terminal comprising:
an optical element, the optical element being selected from the group consisting of a light emission optical element and a light receive optical element;
a support assembly for support of the optical element in a certain position, the support assembly having a base component and a supplementary component, wherein the support assembly is formed by overmolding the supplementary component onto the base component, the supplementary component having a material hardness rating of less than a material hardness rating of the base component, wherein the support assembly is adapted for interference fitting with the optical element, wherein the supplementary component defines an interior surface adapted to encircle the optical element.

2. The indicia reading terminal of claim 1, wherein the optical element is a light emission optical element.

3. The indicia reading terminal claim 2, wherein the light emission optical element is a laser diode assembly.

4. The indicia reading terminal of claim 1, wherein the optical element is an image sensor integrated circuit.

5. The indicia reading terminal of claim 1, wherein the optical element is an imaging lens assembly.

6. The indicia reading terminal of claim 1, wherein the support assembly includes a first region for support of a light emission optical element and a second region for support of a light receiving optical element.

7. The indicia reading terminal of claim 6, wherein the second region for support of a light receive optical element supports a plurality of light receive optical elements, the plurality of light receive optical elements including an image sensor integrated circuit and an imaging lens assembly.

8. The indicia reading terminal of claim 6, wherein the support assembly includes a first region in interference fitting relation with a first optical element provided by image sensor integrated circuit, and a second region in interference fitting relation with a second optical element provided by an imaging lens assembly supported in an aligned position relative to the image sensor integrated circuit.

9. The indicia reading terminal of claim 1, wherein the base component is of unitary construction.

10. The indicia reading terminal of claim 1, wherein the supplementary component is of unitary construction.

11. The indicia reading terminal of claim 1, wherein one or more surfaces of the supplementary component adapt the support assembly for interference fitting with the optical element.

12. The indicia reading terminal of claim 1, wherein one or more surfaces of the base component in combination with one or more surfaces of the supplementary component adapt the support assembly for interference fitting with the optical element.

13. The indicia reading terminal of claim 1, wherein the indicia reading terminal includes a printed circuit board, and wherein the support assembly supports the optical element at a certain position on the printed circuit board.

14. A support assembly for support of a plurality of optical elements, the support assembly comprising:
a first region for support of a light emission optical element;
a second region for support of light receive optical element;
wherein the support assembly comprises a base component comprising rigid material, and a supplementary component comprising deformable material;
wherein the supplementary component is adapted to encircle a supported optical element.

15. The support assembly of claim 14, wherein the support assembly comprises a base component comprising rigid material, and a supplementary component comprising deformable material.

16. The support assembly of claim 15, wherein the supplementary component is overmolded onto the base component.

17. A support assembly comprising:

a region for support of an image sensor integrated circuit, the region being partially defined by a base component and a supplementary component, the base component having a greater material hardness rating than the supplementary component, the region being adapted for interference fitting with the image sensor integrated circuit, wherein the support assembly is adapted so that each of a surface of the base component and the supplementary component imparts forces to the image sensor integrated circuit.

18. The support assembly of claim 17, wherein the supplementary component is overmolded onto the base component.

19. The support assembly of claim 17, wherein the region is further adapted for support of an imaging lens assembly at a certain position relative to the image sensor integrated circuit.

20. A support assembly for support of an optical element, the support assembly comprising:

a base component;

a supplementary component overmolded onto the base component;

wherein the support assembly is adapted for securing in a certain position relative to a member external to the support assembly; and wherein the support assembly is adapted for interference fit with an optical element selected from the group consisting of a light emission optical element and a light receiving optical element;

wherein the base component has a material hardness rating of greater than that of the supplementary component;

wherein the interference fit is at least partially defined by the supplementary component; and wherein the supplementary component defines an interior surface adapted to encircle the optical element.

21. The support assembly of claim 20, wherein the support assembly is adapted for securing in a certain position relative a printed circuit board.

22. The terminal of claim 1 wherein the interior surface adapted to encircle the optical element is defined by a single piece of material.

23. The support assembly of claim 14 wherein the interior surface adapted to encircle the optical element is defined by a single piece of material.

24. The assembly of claim 14, wherein the supplementary component is of unitary construction.

25. The support assembly of claim 17, wherein the supplementary component is of unitary construction.

26. The support assembly of claim 20 wherein the interior surface adapted to encircle the optical element is defined by a single piece of material.

27. The support assembly of claim 20 wherein the supplementary component is of unitary construction.

* * * * *